United States Patent [19]
McKay

[11] Patent Number: 5,303,987
[45] Date of Patent: Apr. 19, 1994

[54] EMPTY/LOAD CHANGEOVER VALVE FOR RAILWAY CAR

[75] Inventor: Albert A. McKay, Stoney Creek, Canada

[73] Assignee: Westinghouse Air Brake Company, Wilmerding, Pa.

[21] Appl. No.: 88,953

[22] Filed: Jul. 12, 1993

[51] Int. Cl.⁵ .............................................. B60T 8/18
[52] U.S. Cl. .................................. 303/22.2; 303/22.8
[58] Field of Search .................. 303/22.2, 22.7, 22.8, 303/22.3, 9.69; 188/195

[56] References Cited

U.S. PATENT DOCUMENTS

3,883,188 5/1975 Wickhan ............................ 303/22.2
5,106,168 4/1992 McKay .............................. 303/22.2

Primary Examiner—Robert J. Oberleitner
Assistant Examiner—Lee W. Young
Attorney, Agent, or Firm—Gary J. Falce

[57] ABSTRACT

An empty/load changeover valve device for a railway car having a proportioning valve including a valve member via which brake cylinder pressure is supplied and released and a balance piston to which the valve member is connected. The balance piston has equal opposing pressure areas both of which are subject to brake pressure in the "load" setting of the changeover valve device, one of the pressure areas being vented in the "empty" setting, thereby establishing either a non-proportioning mode of brake control or a proportioning mode of brake control. In the "empty" setting, brake supply pressure is connected to an equalizing reservoir. A regulating valve is provided to interrupt this connection until the brake supply pressure reaches a predetermined value, thereby preventing the other pressure area of the balance piston from being unloaded sufficiently to cause an inadvertent opening of the check valve member and a consequent drop in brake cylinder pressure.

10 Claims, 1 Drawing Sheet

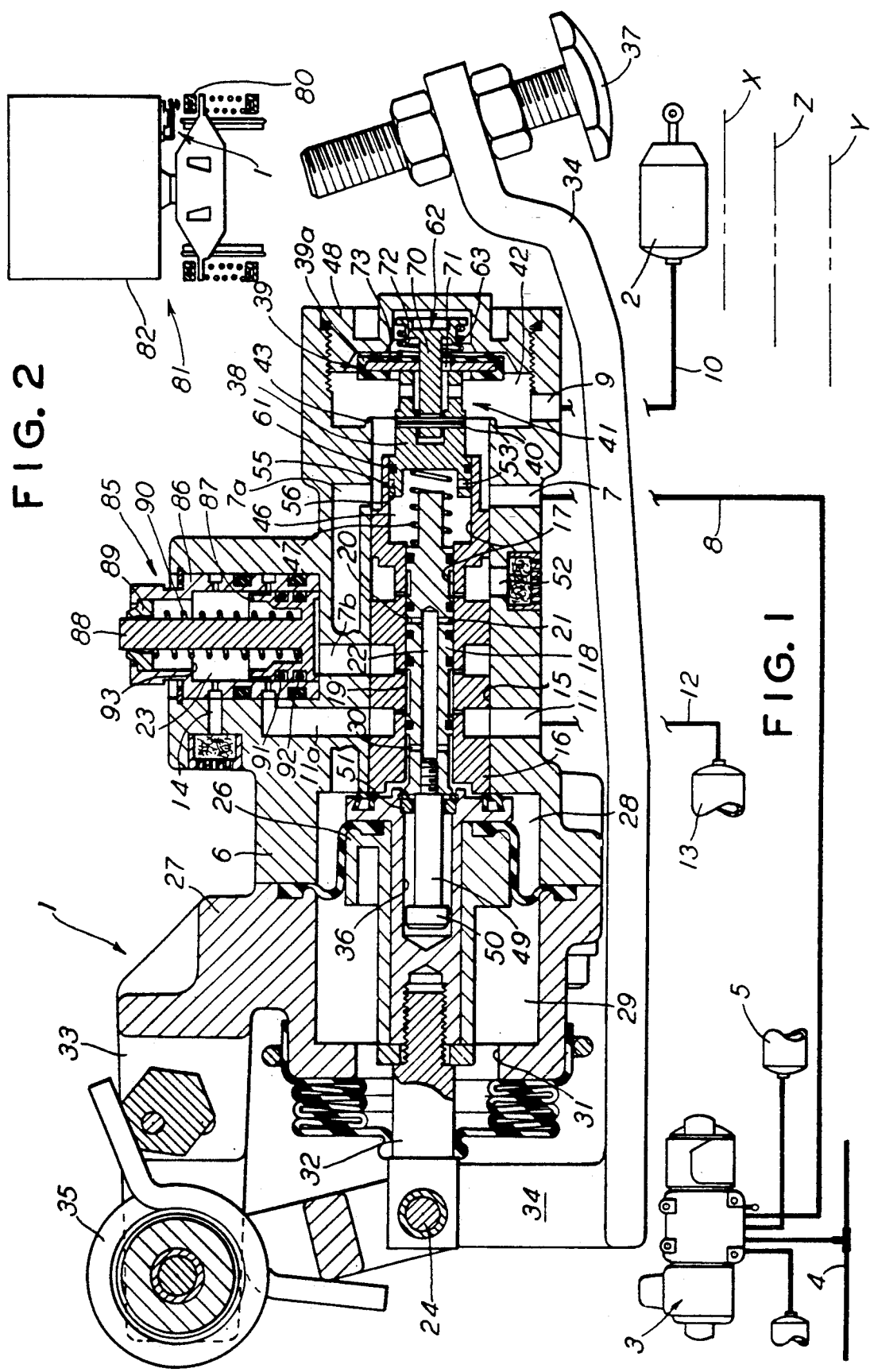

EMPTY/LOAD CHANGEOVER VALVE FOR RAILWAY CAR

BACKGROUND OF THE INVENTION

The present invention relates to an empty/load type brake control system for a railway freight car and, more particularly, to an empty/load changeover valve device that employs a proportioning valve to load-adjust the brake cylinder pressure in the empty range of car weight.

Single capacity brake equipment produces a brake shoe force that is independent of car loading, thus making it difficult to achieve desirably higher braking ratios for a loaded car without exceeding an empty car braking ratio sufficient to cause wheel slide. Sliding wheels are undesirable from the standpoint of reduced braking retardation, and slid-flat wheels.

Special brake equipment is therefore necessary to increase the loaded car braking ratio without incurring the consequence of a wheel slide condition when braking an empty car. Such equipment automatically adjusts brake shoe force according to the load condition of the car. These special equipments fall into two primary categories, dual capacity empty/load braking and multiple capacity or continuously variable braking.

In the dual capacity empty/load equipment, there are just two settings, one for "empty" braking and one for "load" braking, the changeover point between the "empty" and "load" settings being selected at some predetermined car weight, usually at 20% of the full load capacity weight. In arbitrarily selecting this changeover point, it will be appreciated that a given car can be generally under-braked by the reduced brake pressure when the car weight is in the upper end of the "empty" weight range, since essentially the same adhesion demand is available at the lower end of the "load" weight range at which maximum braking force is capable of being supported without sliding the car wheels.

In the variable load type equipment, braking pressure is proportioned according to the actual load, generally throughout the full range of car loading. It will be appreciated, however, that the proportioned brake pressure is selected in accordance with the maximum brake pressure (emergency) capable of being developed from the maximum running pressure normally carried by a train (110 psi). Therefore, when making relatively light service brake applications or when making a maximum brake application from a relatively low running pressure (70 psi), the proportioned brake pressure may be far less than that capable of being supported by the adhesion demand. Accordingly, less than optimum brake efficiency is realized under certain brake conditions with variable load type brake equipment, as well as single capacity equipment, in order to protect against wheel sliding on an empty car under maximum braking conditions.

In U.S. Pat. No. 5,005,915, an empty/load valve device is disclosed comprising a balance piston having equal opposing pressure areas, the balance piston being connected to a supply check valve via which brake pressure is connected from the car control valve device to the brake cylinder and released therefrom. One pressure area of the balance piston is subject to the upstream brake pressure under all conditions of car loading, while the opposing pressure area is either pressurized or depressurized depending upon the car being in an "empty" or "load" condition. In the "empty" condition, a differential pressure is created across the balance piston to establish a proportional mode of brake control in which the brake cylinder pressure is reduced by a certain percentage. A proportioning spring acts on the balance piston to vary this percentage of proportioning according to the actual car load during "empty" condition.

However, since an equalizing reservoir is required in such proportional type dual capacity equipments, to maintain proper equalization pressure at the car control valve and thereby prevent an over-reduction of brake pipe pressure from producing brake cylinder pressure in excess of the desired empty brake cylinder pressure, it is possible under certain operating situations to experience an undesirable drop in brake cylinder pressure during changeover from "load" to "empty" condition of brake control. For example, should the buildup of upstream brake cylinder pressure supplied by the car control valve be terminated when changeover between "empty" and "load" occurs, the connection of upstream brake pressure to the previously vented equalizing reservoir could create such a drop in the upstream pressure that the pressure differential across the balance piston would no longer be able to hold the supply check valve closed against the proportioning spring. The sufficiency of this reduction in the upstream brake pressure could arise, for example, where the pipe volume between the car control valve and empty/load changeover valve is relatively small as compared to the volume of the equalizing reservoir. Consequent opening of the supply check valve by the proportioning spring, in turn, connects the brake cylinder pressure to the equalizing reservoir, resulting in the aforementioned undesirable drop in brake cylinder pressure.

SUMMARY OF THE INVENTION

It is the object of the present invention, therefore, to prevent an inadvertent reduction in brake cylinder pressure during transition of an empty/load changeover valve device.

Another object of the invention is to provide a visual indicator for monitoring the transition of the empty/load changeover valve device to its "empty" condition.

Yet another object of the invention is to provide a single valve device capable of providing the dual function of regulating upstream pressure during "empty" condition, as well as indicating the "empty" condition of brake control.

In accordance with the foregoing objectives, there is provided an empty/load changeover valve device for use in a railway vehicle brake control system that includes a brake cylinder, and a brake control valve via which fluid under pressure is connected to the brake cylinder and released therefrom. The changeover valve device includes load sensing means for measuring the distance between the vehicle sprung and unsprung members to provide an empty setting and a load setting of the changeover valve device depending upon this distance being greater or less than a predetermined distance. An inlet of the changeover valve device is connected to the control valve and an outlet is connected to the brake cylinder. A valve member is disposed between the inlet and outlet via which brake cylinder pressure is conducted. Connected to the valve member is a balance piston having equal opposing pressure areas subject to the pressure at the inlet in the load setting of the changeover valve device. Empty/load valve means is connected to the load sensing means to depressurize one of the opposing pressure areas in the empty setting, whereby a fluid pressure force imbalance is established across the balance piston in the direction of closure of the valve member, the empty/load valve means further connecting the inlet to an equalizing reservoir in the empty setting.

A regulating valve is provided between the inlet and the equalizing reservoir, which prevents the upstream brake pressure from being connected to the equalizing reservoir except when this upstream brake pressure exceeds a predetermined value. The regulating valve includes a visual indicator that is visible when the empty/load changeover valve is in its "empty" setting.

The foregoing objects and other objects, features and advantages of the present invention will become apparent from the following more detailed explanation when taken in conjunction with the accompanying drawings in which:

FIG. 1 is a sectional assembly view of an empty/load changeover valve device of the present invention connected between a control valve device and brake cylinder of a railway car and shown in its de-actuated condition; and FIG. 2 shows a railway car in outline including a body or sprung portion on which the empty/load changeover valve of FIG. 1 is mounted and a truck or unsprung portion with which the empty/load valve sensing arm is engageable as a measure of the car body deflection and accordingly the car load.

DESCRIPTION AND OPERATION

In accordance with the present invention, there is shown in FIG. 1 an empty/load changeover valve device 1 interposed between a brake cylinder device 2 and a freight brake control valve device 3. As is well known, such a control valve device 3 operates on the pressure equalization principle in response to reductions of the air pressure carried in a train brake pipe 4. An auxiliary reservoir 5 is charged to the pressure carried in brake pipe 4 and supplies air to brake cylinder device 2 in response to and in an amount dependent upon the reduction of brake pipe pressure, as controlled by control valve device 3. Pressure equalization exists between the compressed air in brake cylinder 2 and auxiliary reservoir 5 when a full service reduction of the brake pipe pressure is made.

The main body 6 of changeover valve device 1 is provided with an inlet passage 7 that is connected by a brake cylinder supply pipe 8 to control valve device 3, an outlet passage 9 that is connected by a delivery pipe 10 to brake cylinder device 2, a passage 11 that is connected by a pipe 12 to an equalizing reservoir 13, and vent passages 14, 52 that are open to atmosphere.

Main body 6 further includes a bore 15 in which a bushing 16 is fixed, the respective passages 11 and 52 being connected to a stepped bore 17 of bushing 16, in the smaller diameter of which a spool valve 18 is axially disposed. Surrounding the periphery of spool valve 18 are annular grooves 19 and 20, groove 20 having a connecting port 21 leading to a central passage 22 of spool valve 18. Annular O-ring seals surrounding the periphery of spool valve 18 seal the respective annular grooves.

Additional passages 7b and 11a are connected from bore 15 to a cavity 23 in body 6, cavity 23 housing a regulating valve 85 and being connected to vent passage 14. A bushing 86 in cavity 23 receives a piston valve 87 of regulating valve 85, the piston having a stem 88 that is guidably supported in a spring seat 89 in the open end of bushing 86. A control spring 90 is captured between spring seat 89 and the head of piston valve 87. Spring 90 biases piston valve 87 toward the de-actuated position shown, in which a pair of O-ring seals 91, 92 carried on the head of piston valve 87 engage bushing 86 between the port of passage 11a and the bottom of the bushing. Bushing 86 is provided with a stop shoulder 93 with which piston valve 87 is engageable in its actuated position, in which the piston valve O-ring seals 91, 92 engage bushing 86 between the ports of passages 11a and 14.

A diaphragm type actuating piston 2 is clamped between main body 6 and an end body 27 to form on one side an actuating chamber 28 and on the other side a vent chamber 29. Actuating chamber 28 is communicated with central passage 22 of spool valve 18 via a connecting port 30 adjacent the left-hand end of the spool valve, and with inlet passage 7 via a branch passage 7a.

Projecting through an opening 31 in end body 27 is a push rod 32 of actuating piston 26. An extension 33 of end body 27 pivotally supports a sensor arm 34 to which push rod 32 is connected by a pin 24 to effect rotation of the sensor arm in response to operation of the actuating piston against the resistance of a torsion type retracting spring 35. In its retracted position, as shown, actuating piston 26 is engaged with a stop provided by the area of body 6 surrounding bore 15, and an adjusting screw 37 of sensor arm 34 is displaced from an unsprung member, such as the truck side frame 80 of a railway car 81, on the body 82 or sprung portion of which is mounted changeover valve device 1, as shown in FIG. 2. Reference line X in FIG. 1 represents the position of the car side fram 80 relative to the car body 82 in a full load condition of car weight. Reference line Y represents the position of the car side frame 80 relative to the car body 82 in a completely "empty" condition of car weight. A changeover point Z is selected representing the car weight at which transition occurs between an "empty" and "load" condition of car weight.

Aligned axially in the larger diameter of bore 17 adjacent the right-hand side of spool valve 18 is a balance piston 38 having an annular groove 56 and an O-ring seal 61 surrounding its periphery. Balance piston 38 cooperates with a pressure control valve 39, each of which have equal opposing pressure areas and together comprise a proportioning valve 41 that may be controlled to operate in either a proportioning mode or in a non-proportioning mode. Pressure control valve 39 consists of an annular valve element 39a and a release check valve 62 having a stem 70 that passes through an opening 71 in valve element 39a and is connected to balance piston 38 by a roll pin 40, for example. Release check valve 62 further includes an annular valve seat 72 that is adapted to engage the right hand side of valve element 39a when pulled leftward by balance piston 38 following engagement of valve element 39 with valve seat 43. A bias spring 63 is located between release check valve 62 and valve element 39a to bias check valve seat 72 in an open direction. The strength of spring 63 is a function of the air pressure in cavity 42 and the area enclosed by valve seat 72. Spring 63 must be marginally stronger than the area of valve seat 72 times the maximum pressure developed in chamber 42, in empty, such that during a brake release, spring 63 can vent the brake cylinder, unaided by retracting spring 35. This condition would only exist should spring 35 fail.

On the other side of the equation bias spring 63 must be lighter than the force created by the area of piston 38 times the pressure in passage 7 after equalization volume 13 has been charged. This constraint ensures that check valve seat 72 closes when proportioning valve 41 moves to empty position and valve element 39a seats with valve seat 43. The left hand side of valve element 39a of pressure control valve 39 is arranged to engage and disengage an annular valve seat 43 that is fixed between bore 15 and a chamber 42 into which bore 15 opens on the side of bore 15 opposite actuating chamber 28. Inlet passage 7 opens into bore 15 at one side of valve seat 43 and outlet passage 9 opens into chamber 42 at the other side of valve seat 43. Accordingly, engagement of valve element 39a with valve seat 43 serves to interrupt the flow of compressed air between control valve device 3 and brake cylinder device 2, and the disengagement of valve element 39a from valve seat 43 establishes this flow path. Provided in bushing 16 is a port 55 that connects the area of bore 15 at the one side of seat 43 to stepped bore 17 in which balance piston 38 operates.

Depending upon the axial position of balance piston 38, O-ring 61 either cuts off or establishes communication between port 55 and an annular groove 56 on the periphery of balance piston 38. A balance chamber 46 that is formed between spool valve 18 and balance piston 38 is connected to annular groove 56 by a connecting port 53 in balance piston 38.

Disposed in balance chamber 56 between spool valve 18 and balance piston 38 is a proportioning spring 47. In addition to providing the desired variable effect on the proportional brake cylinder pressure through the empty range of car loading, this proportioning spring 47 also counteracts the differential pressure force on spool valve 18, due to the air pressure effective in actuating chamber 28, in order to stabilize the spool valve in the face of car rock and roll oscillations. The smaller pressure area of spool valve 18 relative to the effective pressure area of balance piston 38 limits the force that spring 47 can exert on balance piston 38 in relation to the pressure.

Due to the area relationship between the balance piston 38 and spool 18, this limit becomes a percentage of the final brake cylinder pressure, e.g. 68%.

A screw-threaded cover 48 closes chamber 42 and includes a recess 73 that serves as a stop against which the valve element 39a rests under the influence of proportioning spring 47.

Spool valve 18 is connected to actuating piston 26 through a lost-motion connection therebetween. This lost-motion connection is provided by a connecting stem 49 that is fixed to spool valve 18 at its one end and is formed with a head 50 at its other end that projects into a bore 36 in actuating piston 26.

Head 50 of connecting stem 49 is axially spaced-apart from a shoulder washer 51 in bore 38, when the actuating piston 26 is in contact with its limit stop in the retracted position of sensor arm 34, and spool valve member 18 is in its rightward-most position, as shown. This distance between head 50 and shoulder washer 51 corresponds to the distance adjusting screw 37 of sensor arm 34 is retracted from the railway car side frame when the car is in a full load condition of car weight, as represented by line X. Thus, actuating piston 26 is free to move leftward from its shown position without imparting movement of spool valve 18 until the sensor arm 34 rotates through a range of travel sufficient to establish engagement with a fully loaded car side frame. In this manner, sensor arm 34 can be fully retracted to its shown position without requiring corresponding travel of spool valve member 18, so that the length of main body 6 housing the spool valve member 18 and bushing 16 can be limited in size.

BRAKE APPLICATION ON LOADED CAR

When a brake application is made by reducing the brake pipe pressure in a well-known manner, control valve device 3 connects air from the auxiliary reservoir 5 to brake cylinder supply pipe 8. The air supplied to pipe 8 is connected directly to brake cylinder 2 via inlet passage 7, open pressure control valve 39, outlet passage 9 and pipe 10; to actuating chamber 28 via inlet passage 7 and branch passage 7a; and to balancing chamber 46 via port 55, groove 56, and port 53.

The air admitted to balancing chamber 46 acts on one side of balance piston 38 to counteract the brake cylinder air pressure acting on the opposite side of balance piston 38. The opposing equal pressure areas of check valve element 39a are also subject to the brake cylinder pressure effective in cavity 42. Accordingly, proportioning valve 41 is force-balanced by the effective air loading, but is biased by spring 63 and proportioning spring 47 to maintain valve element 39a of pressure control valve 39 open. Consequently, the proportioning valve 41 is conditioned to operate in its non-proportioning mode, i.e., without reducing the pressure supplied to brake cylinder 2 via pipe 8.

As the brake cylinder pressure builds up, the corresponding pressure admitted to actuating chamber 28 acts on actuating piston 26. As the force of this pressure overcomes the opposing force of retraction spring 35, the sensor arm 34 is forced by push rod 32 to rotate about its pivot connection with extension 33 of end body 27 until adjusting screw 37 encounters the car side frame 80.

As long as the car weight is in the "load" range, such that the position of the car side frame 80 relative to the car body 82 is between the full load and changeover points represented by lines X and Z, shoulder washer 51 will move with actuating piston 26 only sufficiently to pick up head 50 of connecting stem 49 and pull spool valve 18 in a leftward direction a limited distance corresponding to the degree of rotation of sensor arm 34. Initial movement of spool valve 18 within this limited range of travel isolates passage 7b leadig to the indicator valve actuating chamber from passage 11 and pipe 12 leading to equalizing reservoir 13. Within this limited distance of movement of spool valve 18, equalizing reservoir 13 remains vented via pipe 12, passage 11, spool groove 19, passage 11a, indicator valve bushing 86 and vent passage 14, it being understood that spring 90 holds piston valve 87 of regulating valve 85 is in the de-actuated position, as shown, in which a flow path is established between passages 11a and 14. Although proportioning spring 47 becomes increasingly relaxed with this leftward movement of spool valve 18, sufficient force is still provided to maintain valve element 39a of pressure control valve 39 in its open position through the entire load range of travel of spool valve 18. In this non-proportioning mode of operation, brake cylinder pressure thus corresponds to the pressure supplied to pipe 8 via control valve device 3.

In addition to valve element 39a being disengaged from fixed valve seat 43, it is also disengaged from valve seat 72 of release check valve 62, by the action of spring 63, thereby eliminating wear of valve element 39a during this period.

BRAKE RELEASE ON LOADED CAR

When a brake release is desired, brake pipe pressure is increased in a well-known manner to cause control valve device 3 to vent supply pipe 8. With pressure control valve 39 being maintained in its open position, as explained, the air in brake cylinder 2 is released via outlet passage 9, open pressure control valve 39, inlet passage 7, and the vented supply pipe 8.

BRAKE APPLICATION ON EMPTY CAR

When the load sensor arm 34 is able to rotate sufficiently that adjusting screw 37 is deflected beyond the empty/load changeover point represented by line Z before encountering the car side frame during a brake application, the car weight is indicated as being in the "empty" range of travel in which registry is established between vent passage 52 and balancing chamber 46. Preferably only a single connecting port 55 is provided in bushing 16 via which air is able to flow from chamber 42 to balancing chamber 46. On the other hand, the number and/or the size of the ports in bushing 16 connecting chamber 46 to vent passage 52 is greater than that of the single connecting port 55, so that the pressure in chamber 46 is rapidly depleted when balance chamber 46 is connected to vent passage 52. This creates an unbalanced air load across balance piston 38 in the lefthand direction. Consequent leftward movement of balance piston 38 pulls release check valve 62 with it via stem 70 and roll pin 40. During this leftward movement of release check valve 62, spring 63 urges valve element 39a leftward into engagement with seat 43. Following engagement of valve element 39a with seat 43, continued leftward movement of balance piston 38 increases the compression of spring 38, allowing release check valve seat 72 to be pulled into engagement with check valve element 39a. This closure of pressure control valve 39 establishes the proportioning mode of operation of proportioning valve 41. Also, movement of proportioning valve 41 to its closed position causes O-ring 61 on balance piston 38 to be shifted to the lefthand side of connecting port 55 to cut off the supply of pressure to the vented balance chamber 46. In addition, the position of spool valve 18, as established by the vehicle load condition, determines the degree of compression of proportioning spring 47 at the time of closure of pressure control valve 39. The pick-up rate of proportioning spring 47 can be selected so as to make it more or less sensitive to the "empty" car load condition, as desired.

At the same time, spool groove 20 is registered with port 7b leading to the face of piston valve 87. The air supplied by control valve 3 to pipe 8 is thus connected to the face of piston valve 87. Spring 90 is selected so that piston valve 87 is prevented from being actuated until the pressure in pipe 8 and thus effective at the face of piston valve 87 exceeds at least the pressure at which spool valve 18 is shifted to its "empty" range, and preferrably at a pressure just below the final brake cylinder equalization pressure, e.g., 50 psi for a minimum 70 psi brake pipe charge. When this occurs, piston valve 87 is shifted to its upper-most, actuated position in which O-ring seals 91, 92 are both located between the ports of passages 11a and 14. Only then is air connected from supply pipe 8 to equalizing reservoir 13 via inlet passage 7, branch passage 7a, actuating chamber 28, opening 30, central passage 22, connecting port 21, spool groove 20, passage 7b, regulating valve 85, passage 11a, passage 11 and pipe 12.

In the actuated position of piston valve 87, stem 88 projects from its normally retracted position within bushing 86 to provide a visual indication that changeover valve device 1 is in its "empty" setting.

In the event the upstream pressure in supply pipe 8 effective on the face of piston valve 87 falls below a value capable of overcoming the opposing force of spring 90, for any reason, as for example, due to its equalization with equalizing reservoir 13 in the absence of any continuing buildup of pressure in supply pipe 8, spring 90 will be effective to force piston valve 87 downwardly to an intermediate position in which O-ring seal 91 is located on one side of the port of passage 11a and O-ring seal 92 is located on the other side. This effectively isolates equalizing reservoir 13 from atmosphere and from pipe 8, the former serving to maintain sufficient force differential across balance piston 38 to prevent proportioning spring 47 from opening valve element 39 and inadvertently reducing the effective brake cylinder pressure. In this intermediate position of piston valve 87, stem 88 will continue to be exposed as a visual indication that the changeover valve is in its "empty" setting.

Assuming now that a further increase of brake pressure in supply pipe 8 is provided by control valve device 3, the increased pressure effective at the face of piston valve 87 will force it to its actuated position, re-establishing the connection of passages 7b and 11a. The increasing upstream pressure in supply pipe 8 will again be connected to equalizing reservoir 13 in parallel with brake cylinder 2, such increasing pressure counteracting a tendency to lose pressure in chamber 42 acting on the side of balance piston 38 opposite the depleted pressure in chamber 46. The integrity of the pressure differential across balance piston 38 in the proportioning mode will thus be preserved by the action of regulating valve 85 to prevent inadvertent loss of brake cylinder pressure during transition from "load" to "empty" condition of car loading.

The volume of equalizing reservoir 13 is selected so that following a proportioned full service brake application, brake cylinder pressure will be modulated in accordance with the effective ratio of proportioning valve 41 and the compression force of spring 47; and the interconnected equalizing reservoir and auxiliary reservoir pressures will be equalized at substantially the reduced brake pipe pressure. From an initial charge of 70 psi, this equalization will occur between approximately 48 psi and 52 psi, thereby effectively preventing an overreduction of brake pipe pressure from producing the aforementioned undesired further increase in the "empty" car brake cylinder pressure.

During the proportioning phase of the brake pressure buildup, the supply of air to brake cylinder 2 via supply pipe 8 is reduced by the action of proportioning valve 41 according to the differential air load across balance piston 38 and pressure control valve 39 offset by the force exerted by proportioning spring 47 according to the particular "empty" car load condition that might exist. It should be noted at this point that in the closed position of valve element 39a, a differential pressure area is subject to the air in supply pipe 8, as determined by the difference in diameter between balancing piston 38 and the diameter of valve element 39a within the area defined by valve seat 43. In this manner, a rightward acting force differential is exerted on proportioning valve 41 to effect opening of valve element 39a in response to a further increase of brake cylinder supply pressure when it is desired to increase a partial brake application.

As previously mentioned, proportioning spring 47 exerts a variable force on proportioning valve 41 depending upon the actual position of spool valve 18 in its "empty" range of travel, as determined by the degree of sensor arm rotation required before adjusting screw 37 encounters the car side frame. If, for example, the adjusting screw 37 encounters the car side frame just beyond the changeover point in the "empty" range of car weight, the degree of compression of proportioning spring 47 will approach a maximum due to minimal leftward movement of spool valve 18 into the "empty" range of travel. On the other hand, if the car weight is such that the adjusting screw 37 fails to encounter the car side frame until it is at the other end of the "empty" range, the degree of compression of proportioning spring 47 will be substantially reduced, due to further leftward movement of spool valve 18 into the "empty" range of travel. The force exerted on proportioning valve 41 by proportioning spring 47 will thus vary with the degree of car loading, such that the proportioned brake cylinder pressure will be greater for heavier car weights than for lighter car weights within the "empty" car brake range.

In accordance with the foregoing, the effect of proportioning spring 47 should now be clear in terms of achieving different levels of proportional brake cylinder pressure for a given brake application, depending upon the actual weight of a railway car that is conditioned for "empty" car braking.

BRAKE RELEASE ON EMPTY CAR

When a brake release is desired, brake pipe pressure is increased in a well-known manner to cause control valve device 3 to vent supply pipe 8. Consequently, the air in equalizing reservoir 13 is also vented via pipe 12, passages 11, 11a, bushing 86 of regulating valve 85, passage 7b, spool groove 20, central passage 22, port 30, actuating chamber 28, passage 7a, and passage 7. The resultant reduction of pressure acting on the face of piston valve 87 allows spring 90 to reset the piston valve to its de-actuated position in which the venting of equalizing reservoir 13 via the above-mentioned flow path is cut off. In this de-actuated position, piston valve 87 concurrently vents equalizing reservoir 13 via pipe 12, passages 11, 11a, and vent passage 14.

The reduction of pressure in actuating chamber 28 allows spring 35 to retract sensing arm 34 and at the same time force actuating piston 26 to move in a rightward direction until shoulder washer 51 engages the lefthand side of spool valve 18. Continued rightward movement of actuating piston 26 by spring 35, as the pressure in chamber 28 continues to be vented via control valve device 3, forces spool valve 18 to also move in a rightward direction into contact with balance piston 38. Further rightward movement of this assembly acts through roll pin 40 and stem 70 of release check valve 62 to cause the release check valve seat 72 to be disengaged from valve element 39a, it being understood that valve element 39a remains engaged with seat 43 due to the pressure and area differential across pressure control valve 39.

Following opening of release check valve 62, the heretofore trapped pressure in brake cylinder 2 and chamber 42 is vented via the open release check valve, opening 71 in valve element 39a, inlet passage 7, supply pipe 8 and control valve device 3. When the pressure in chamber 42 and brake cylinder 3 reduces sufficiently, retracting spring 35, acting through actuating piston 26, spool valve 18, and balance piston 38, will force valve element 39a off its seat 43, thereby establishing final blowdown of brake cylinder pressure past pressure control valve 39.

When actuating piston 26 reaches its full release position, as shown in FIG. 1, in consequence of complete release of the brake cylinder pressure being realized, spool valve 18 will be positioned to effect final venting of pressure trapped in equalizing reservoir 13 and at the face of piston valve 87, and to concurrently cut-off venting of balance chamber 46.

Proportioning spring 47, acting through balance piston 38, as shown in FIG. 1, forces valve element 39a against stop 73 and balance piston 38 is aligned axially in stepped bore 17 such that port 55 in bushing 16 is communicated with annular groove 56 and connecting passage 53 in the balance piston, thereby providing for re-pressurization of balance chamber 46 in response to a subsequent brake application.

I claim:

1. For use in a railway vehicle brake control system including a brake pipe charged to a certain chosen pressure, a brake cylinder device, a brake control valve device via which fluid under pressure is supplied to said brake cylinder device and released therefrom in accordance with variation of the fluid pressure in said brake pipe, and sprung and unsprung members, an empty/load changeover valve device mounted on one of the sprung and unsprung members of said vehicle comprising:

(a) load sensing means engageable with the other of said sprung and unsprung members for measuring the distance therebetween to provide an empty setting and a load setting of said changeover valve device depending upon said distance being greater or less than a predetermined distance corresponding to the changeover point between said empty and load settings;

(b) an inlet connected to said control valve device and an outlet connected to said brake cylinder device;

(c) supply valve means including a valve member between said inlet and outlet via which fluid under pressure is conducted;

(d) a balance piston to which said valve member is connected having equal opposing pressure areas subject to the fluid pressure effective at said inlet in said load setting of said changeover valve;

(e) an equalizing reservoir;

(f) empty/load valve means operated by said load sensing means for de-pressurizing one of said opposing pressure areas in said empty setting of said changeover valve device to establish a differential pressure across said balance piston in the direction of closure of said valve member, said empty/load valve means in said empty setting further connecting said inlet to said equalizing reservoir; and (g) regulating valve means for interrupting said fluid pressure communication between said inlet and said equalizing reservoir when the fluid pressure at said inlet is less than a predetermined value.

2. A changeover valve device as recited in claim 1, wherein said load sensing means comprises:
(a) a sensing arm movable from a retracted position toward engagement with said other of said sprung and unsprung members;
(b) a retracting spring connected to said sensing arm to urge said sensing arm toward said retracted position; and
(c) an actuating piston connected to said sensing arm and subject to fluid pressure effective at said inlet to urge movement of said sensing arm from said retracted position toward engagement with said other of said sprung and unsprung members in opposition to said retracting spring, the fluid pressure at said inlet when said sensing arm is at the changeover point between said empty and load settings being less than said predetermined value.

3. A changeover valve device, as recited in claim 2, further comprising:
(a) first passage means for providing fluid pressure communication between said inlet and said actuating piston;
(b) a cavity having said regulating valve means;
(c) a second passage to which said equalizing reservoir is connected;
(d) third and fourth passages connected to said cavity; and
(e) said empty load valve means comprising a spool valve member connected to said actuating piston, said spool member providing fluid pressure communication between said second and third passages and between said first and fourth passages in said empty setting.

4. A changeover valve device as recited in claim 3, wherein said regulating valve means comprises:
(a) a piston valve operatively disposed in said cavity including a piston head having seal means thereon, the face of said piston head being subject to fluid under pressure in said fourth passage;
(b) a control spring biasing said piston valve to a de-actuated position in which said seal means is located between said third and fourth passages; and
(c) stop means with which said piston valve is engageable in an actuated position in which said seal means is located on the side of said third passage opposite said fourth passage.

5. A changeover valve device as recited in claim 4, wherein said regulating valve means further comprises an indicator stem connected at one end to said piston head, the other end of said indicator stem projecting from said cavity in said actuated position of said piston valve.

6. A changeover valve device as recited in claim 4, wherein said changeover valve device further comprises a fifth passage between said cavity and atmosphere, said seal means in said de-actuated position of said piston valve establishing fluid pressure communication between said third and fifth passages and in said actuated position cutting off fluid pressure communication between said third and fifth passages.

7. A changeover valve device as recited in claim 6 wherein said seal means comprises a pair of spaced-apart seal rings encircling said piston head, respective ones of said spaced-apart seal rings being located on opposite sides of said third passage in an intermediate position in which said piston valve is disposed in response to the fluid pressure effective at said inlet being at said predetermined value.

8. A changeover valve device as recited in claim 7, wherein said regulating valve means further comprises an indicator stem having one end connected to said piston head and the other end projecting from said cavity in said intermediate and actuated positions of said piston valve.

9. A changeover valve device as recited in claim 1, further comprising a spring acting on said balance piston in a direction to effect opening of said supply valve means.

10. A changeover valve device as recited in claim 3, further comprising spring means between said spool valve and said balance piston for urging said balance piston in a direction to effect opening of said supply valve means.

* * * * *